United States Patent [19]

Mathison et al.

[11] Patent Number: 4,763,511
[45] Date of Patent: Aug. 16, 1988

[54] PIPE JOINT SEALING AND TESTING APPARATUS

[75] Inventors: Allen D. Mathison, Richfield; Dale K. Nelson, Minneapolis, both of Minn.

[73] Assignee: Cherne Industries, Inc., Minneapolis, Minn.

[21] Appl. No.: 935,071

[22] Filed: Nov. 21, 1986

Related U.S. Application Data

[63] Continuation-in-part of Ser. No. 785,155, Oct. 7, 1985, abandoned.

[51] Int. Cl.⁴ .............................................. G01M 3/04
[52] U.S. Cl. ...................................... 73/49.1; 73/49.8; 73/46; 138/90; 138/93
[58] Field of Search .............. 73/49.1, 46, 99.5, 49.8, 73/40.5 R; 138/90, 97, 89, 93, 104; 277/34

[56] References Cited

U.S. PATENT DOCUMENTS

| | | | |
|---|---|---|---|
| 1,354,925 | 10/1920 | Svenson | 138/90 |
| 1,788,845 | 1/1931 | Reynolds | 138/90 |
| 1,931,502 | 10/1933 | Marckle | 138/90 |
| 2,481,013 | 9/1949 | Henderson | 138/90 |
| 2,927,456 | 3/1960 | Russell | 73/46 |
| 3,338,088 | 8/1967 | Smith et al. | 73/49.1 |
| 3,503,249 | 3/1970 | Dumond | 73/49.1 |
| 3,593,749 | 7/1971 | Reardon | 138/93 |
| 3,779,068 | 12/1973 | Forsythe | 138/90 |
| 3,902,528 | 9/1975 | Tartabini | 138/90 |
| 3,915,197 | 10/1975 | Piccirilli | 138/93 |
| 3,946,761 | 3/1976 | Thompson et al. | 138/93 |
| 3,951,173 | 4/1976 | Larson | 138/93 |
| 4,070,904 | 1/1978 | Vanderlans | 73/40.5 |

FOREIGN PATENT DOCUMENTS

| | | | |
|---|---|---|---|
| 2339083 | 3/1974 | Fed. Rep. of Germany | 73/46 |
| 358952 | 1/1962 | Switzerland | 73/49.1 |
| 1399 | of 1904 | United Kingdom | 138/93 |
| 212715 | 3/1924 | United Kingdom | 138/93 |
| 329401 | 5/1930 | United Kingdom | 138/93 |
| 706348 | 3/1954 | United Kingdom | 73/46 |

OTHER PUBLICATIONS

Sidu Manufacturing Company, Inc.; Sidu Joint Tester; product advertisement.
Cherne Industries, Inc.; Pipe Testing Products Price List, 1985; p. 5.

Primary Examiner—Stewart J. Levy
Assistant Examiner—Hezron E. Williams
Attorney, Agent, or Firm—Anthony G. Eggink

[57] ABSTRACT

A separable, lightweight and inflatable pipe joint sealing and testing apparatus for large diameter pipes having a multi-membered arched channel support structure having a circular configuration, and having three parallelly disposed channel members extending outward therefrom, and having outer channel members and a centrally disposed testing channel member. A unitary inner sleeve sealing member coextensive with the channel members is provided for covering the channel support structure. The pipe joint sealing and testing apparatus further has a pair of inflatable annular sealing ring members for placement in the outer channel members, a compressed air source means in communication with the pair of inflatable sealing rings, and a compressed fluid ingress and egress structure through the port of the centrally disposed channel member. The apparatus further has a removable test panel mountable to the channel support structure, which has control mechanisms and air pressure and fluid pressure indicators mounted thereto and which are in communication with the compressed air source means and the compressed fluid ingress and egress structure. Additionally, adjustable wheel assemblies are mounted to the interior of the support structure for centering the apparatus about a pipeline joint and for moving the apparatus in a pipeline. An outer sleeve with a chemical dispensing assembly is further provided to chemically seal and pack pipe joint leaks.

20 Claims, 7 Drawing Sheets

PIPE JOINT SEALING AND TESTING APPARATUS

This is a continuation-in-part of application Ser. No. 785,155, filed Oct. 7, 1985, now abandoned.

BACKGROUND OF THE INVENTION

This invention relates to a pipe joint sealing and testing apparatus. Particularly, this invention relates to a pipe joint sealing and testing apparatus for sealingly isolating a large diameter pipeline joint for subsequent testing and sealing purposes.

This invention relates to a pipe joint sealing and testing apparatus of this invention deals generally with a device for isolating and sealing a circumferential area of a pipeline section for subsequent testing and sealing purposes. Particularly, the pipe joint sealing and testing apparatus is for testing the integrity and congruity of pipeline section joints, and more particularly, for testing large diameter pipeline section joints, i.e., 2–18 feet in diameter.

Pipelines are generally comprised of a plurality of pipe sections which abut end to end to provide a continuous and uniform means of transporting fluids, etc. It is important and most often, imperative that the individual pipe joints be properly aligned and joined to provide a leak-free conduit or pipeline. Thus, the proper and reliable testing of pipe joints is important to the construction of pipelines as well as for its continuing use. However, subsequent to initial construction, the settling of ground fill and other phenomenon can separate pipe joints and cause leaks in the pipeline through the separated joints.

Although a number of devices have been developed or proposed to test pipelines for leaks, most are designed to test the integrity of small diameter pipes (i.e. less than 2 feet in diameter). And, to upscale these particular devices for use in large diameter pipelines would yield unduly burdensome and costly devices.

Because pipelines are generally accessible only through manholes or entry ports which have predetermined dimensions, it is necessary that a testing device be transferable through that limited manhole or entry port dimension. Typical manhole or entry port diameters are generally 20–22 inches irrespective of pipeline diameter. Therefore, it is imperative that a testing device for a 6 to 12 feet inside diameter pipeline, for example, be movable through a 20–22 inch diameter entry port.

Devices that have been developed or proposed for use in testing large diameter pipe joints have generally been complex in construction, and difficult to assemble and operate. These devices are generally one piece devices that are designed to remain in a unitary and assembled state for testing new large pipeline constructions. The pipe joint sealing and testing apparatus of this invention is provided to overcome the difficulties and limitations of those prior art devices.

The sealing and testing apparatus of this invention is a seperable, lightweight and easily assembled and unassembled device which permits the transfer of its component parts through a manhole or entry port. And, its components, when assembled, permits the apparatus to be easily moved through a pipeline for sealing and testing purposes.

The sealing and testing apparatus of this invention also is provided with means to chemically seal a pipe section joint or other pipeline fissure. This apparatus and method provides for the sealing, testing and packing of pipe section joints.

SUMMARY OF THE INVENTION

The invention provides a separable, lightweight, inflatable pipe joint sealing and testing apparatus for large diameter pipes. The apparatus is comprised of a multi-membered arched channel support structure having a plurality of connectable segmented arched members each having a circular segment configuration, and having three parallelly disposed channel members extending outward therefrom, and having outer channel members and a centrally disposed testing member area. A unitary inner sleeve member is provided for covering the assembled support structure and is coextensive with the inner portion of the channel members of the channel support structure to seal it from leaking during testing.

The pipe joint sealing and testing apparatus further has a pair of inflatable annular sealing ring members for placement and expansion in the outer channel members, a compressed air source means in communication with the pair of inflatable sealing rings, and test fluid ingress and egress means in communication through a port with the centrally disposed channel member.

The apparatus is further comprised of a removable test panel member mountable to the interior of the channel support structure and which has compressed air and test fluid control means and air pressure and fluid pressure indicating means mounted thereto and being in communication with the compressed air source means and the test fluid ingress and egress means. Additionally provided are adjustable wheel assemblies mounted to the interior of the support structure for moving the apparatus in a pipeline.

The multi-membered support structure is comprised of a plurality of lightweight arched channel sections, which are preferably of an aluminum construction. The multi-membered support assembly additionally has a triangulated cross-member support structure mountable to its interior at certain diametric dimensions, and having lighting assemblies mountable to the top thereof. The multi-membered support assembly additionally is provided with a flexible drain hose in communication with the uppermost point of the centrally disposed member for use with liquid test fluids. The flexible drain hose is provided with a shut off valve.

The adjustable wheel assemblies are each comprised of a frame member mountable to the inner bottom surface of the support structure, adjustment arms attached to the ends of the frame member and a wheel rotatably and pivotly mounted to the ends of the frame member and being in communication with the adjustment arms. Each adjustable wheel assembly additionally has a pair of handle members which are usable to center the apparatus about a pipeline joint for testing.

The test panel member additionally is provided with an automatic closing valve in communication with the compressed air source means, and the closing valve is operative at a predetermined air pressure.

Additionally provided by the invention is an inner liner sleeve member and a pair of inflatable sealing ring members of certain configurations and which are constructed of an elastomeric material. The inflatable sealing ring members additionally have a plurality of circumferentially disposed sealing ribs extending outwardly therefrom and being in a parallel configuration.

Also provided by this invention is a sealing, testing and packing apparatus having an outer flexible sleeve member covering the inflatable sealing rings and which has a chemical dispensing assembly fixed therethrough for testing the integrity of pipeline joints and to chemically seal the leak areas located.

These and other benefits of this invention will become clear from the following description with reference to the drawings.

DESCRIPTION OF THE PREFERRED EMBODIMENTS

The pipe joint sealing and testing apparatus 10 of the invention deals generally with a quickly assembled device for testing the joints in large diameter pipelines, for example, those having a 2-18 feet inside diameter. The device is constructed of individual elements that are designed for entry through a pipeline manhole access which typically have diameters of approximately 20 to 22 inches. It is also within the purview of the invention to provide apparatus for non-circular pipe, such as arch pipe.

Figure 1:
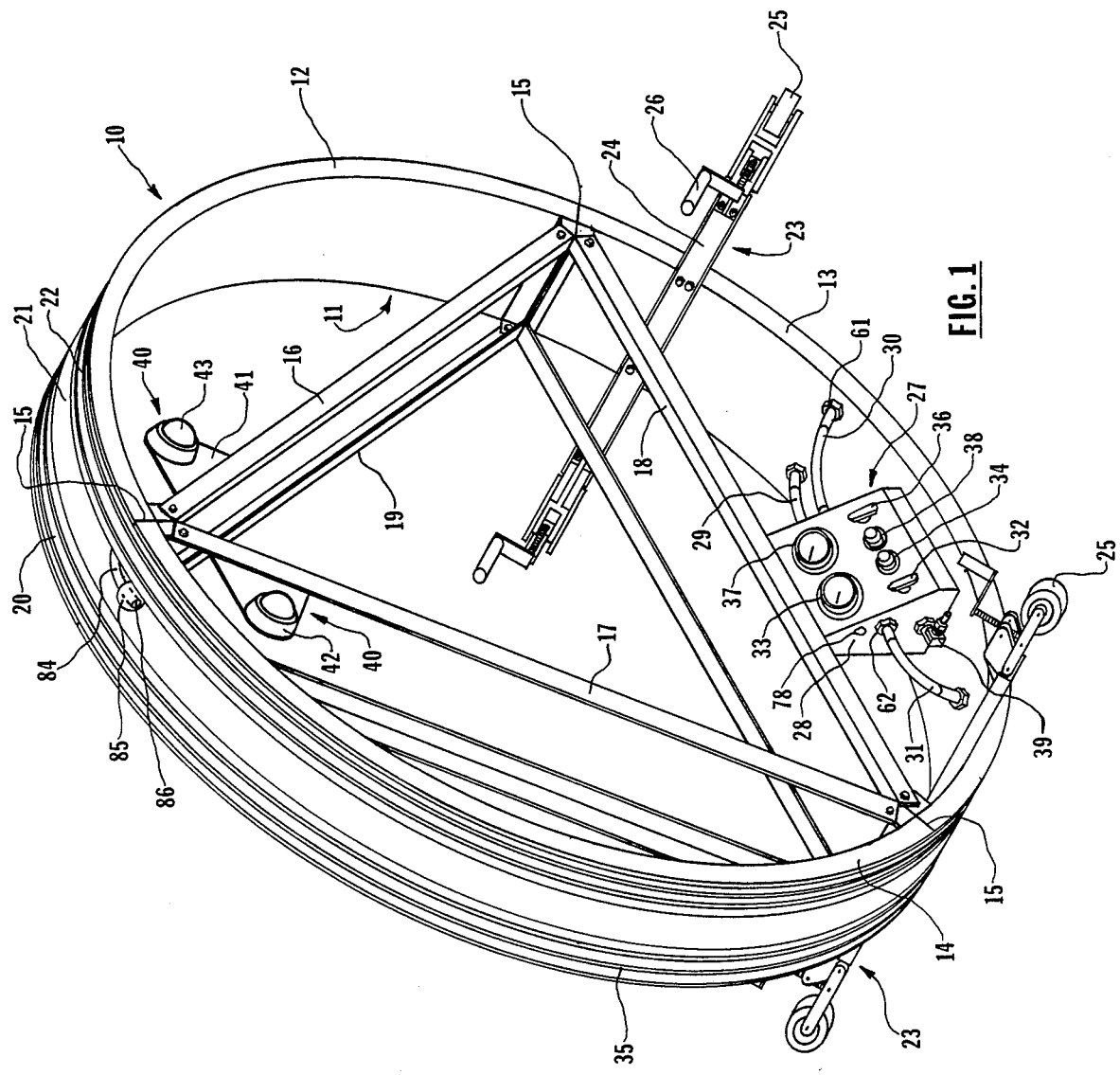
FIG. 1 is an isometric lateral view of the pipe joint sealing and testing apparatus according to the teachings of this invention.

FIG. 1 illustrates the pipe joint sealing and testing apparatus 10 having an assembled channel support structure 11. The channel support structure 11 is a quickly assemblable and unassemblable structure having circular segment structural members 12, 13 and 14 which join at the structure member joints 15. As will be further discussed, an inner sleeve liner 48 is provided to seal joints 15 from leakage during testing.

Figure 2:
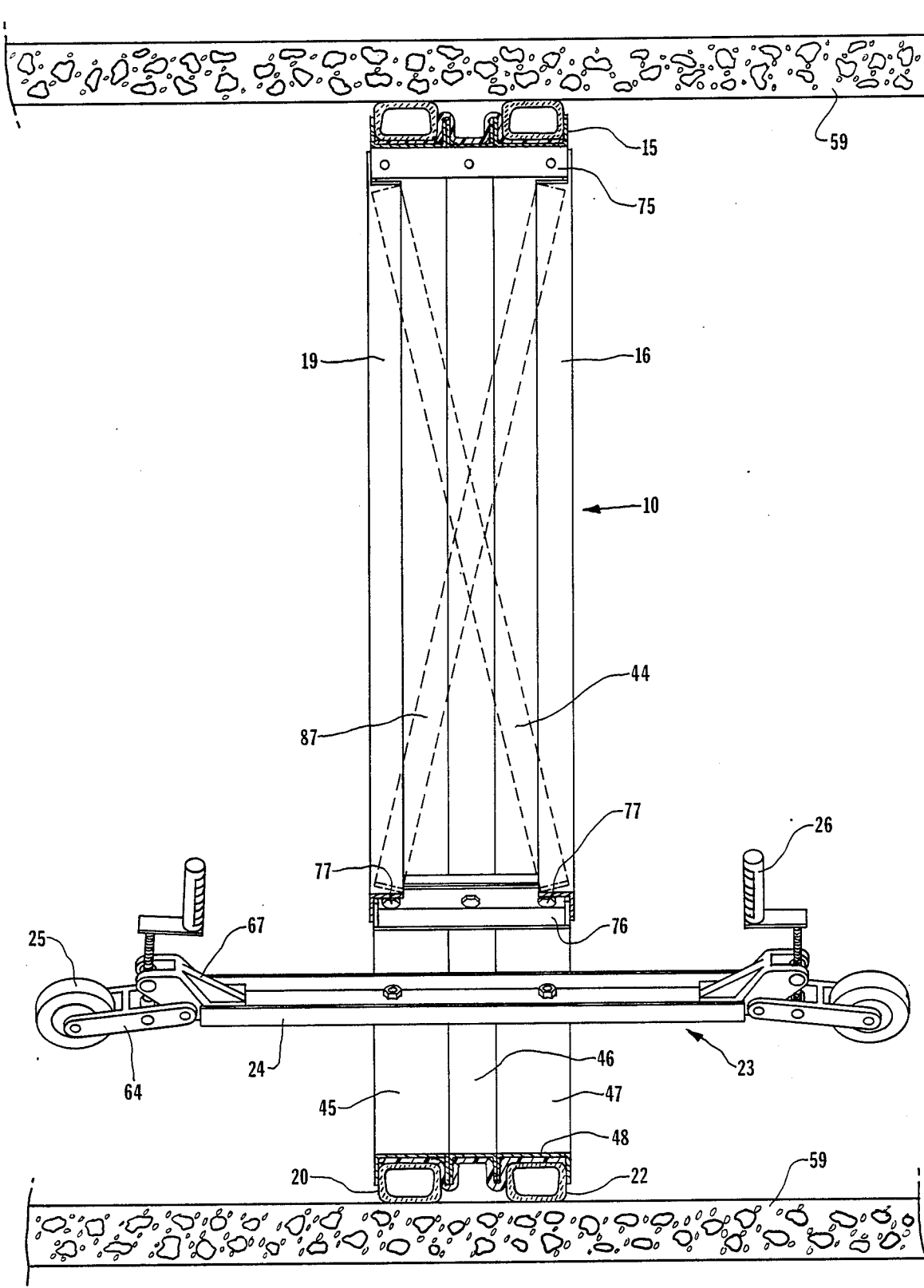
FIG. 2 is a sectional view of the pipe joint sealing and testing apparatus which shows the apparatus in place for use testing use at a joint of two pipeline sections.

The number of the individual structure members is dependent upon the diameter of the pipe joint sealing and testing apparatus 10 itself. Bracing members 16, 17, 18 and 19 are securable at the structure member joints 15. The use and configuration of the bracing member 16 is likewise dependent upon the diameter of the apparatus. For example, for an apparatus for use in a six foot diameter pipeline, the bracing configuration, as shown in FIG. 1, is preferably utilized. For an apparatus for use in 10 to 12 feet diameter pipelines, the cross-bracing elements 44 and 87, as shown in FIG. 2, are preferably utilized to prevent or eliminate twisting of the assembled support structure 11.

The channel support structure 11 has inflatable end elements 20 and 22 with annular sealing ribs 35 at the outer channels of its circumferential exterior surface. And, as is more clearly shown in FIG. 3, a testing channel or testing area 21 is located between the channels supporting the inflatable end elements 20 and 22.

FIG. 1 further shows a pair of wheeled carriage assemblies or leveling and moving mechanisms 23 for the pipe joint sealing and testing apparatus 10. Each of these assemblies has a frame member 24, wheels 25 and adjusting handles 26 which are provided to adjust for movement the pipe joint sealing and testing apparatus 10 through a pipeline for testing its joint areas. As shown, the assemblies are spaced at approximately a 90 degree segment with respect to the support structure 11.

Removably mountable to one segment 13, for example, of the interior surface of the channel support structure 11 is a test panel 27 having a housing 28 which has hoses 29, 30 and 31 connectable to fittings that communicate with the inflatable end elements 20 and the testing channel 21 respectively. It is within the purview of the invention to operate the test panel 27 from a remote location whereby, the respective hoses are longer than shown in the drawing figures for connection to the respective fittings.

The test panel 27 has a valve 32, an adjustable air regulator 34 and an interchangeable (for various pressure readings) test pressure gauge 33 for use by the operator of the pipe joint sealing and testing apparatus 10 in testing a pipe joint for leakage. A test pressure of 3 to 60 p.s.i. can be utilized depending upon the pipe joint to be tested. The valve 36, an adjustable air regulator 38 and a test pressure gauge 37 permit the operator to inflate and deflate the inflatable end elements 20 and 22 to about 30 p.s.i. but perhaps to a higher pressure, such as 100 p.s.i., as may be required. The test valve 32 is a three-position valve (filling of fluid, off position, and a bleeding position).

An air supply inlet 39, which has a quick connect end fitting, is provided for supplying compressed air to the test panel 27 for use in inflating the end elements and as a test fluid. Additionally, a fluid inlet 78 is provided for the input of water, for example, if a liquid fluid is used for testing purposes (hydrostatic application). The respective valves also have automatic closing valves which activate at a pre-set operating pressure.

A pair of illuminating light assemblies 40 are mounted by bracing or support members 41 to and near the end of the bracing members 16, as is shown in FIG. 1. The bulb housings 42 hold bulbs 43, 10 to 20 watts for example, which are used to illuminate the pipeline interior as the assembled pipe joint sealing and testing apparatus 10 is transported therethrough. Additionally, the test panel 27 can be provided with a gauge light.

The sectional view of the pipe joint sealing and testing apparatus 10 shown in FIG. 2 illustrates a channel support structure within a pipe section 59 and being comprised of exterior channel member 45 and channel member 47 and a central testing channel member 46. Importantly, a circumferentially disposed inner sleeve liner 48 is located across the surfaces of the channeled portions and extending beneath the inflatable end elements 20 and 22. The sleeve liner 48 and the end elements are preferably constructed of an elastomeric material such as natural rubber, neoprene or isoprene.

As discussed above, for larger apparatus sizes, alternating or cross brace members 44 and 87 are utilized to extend from support bracket 75 to support bracket 76. Bolts 77 are used to connect the support brackets 75 and 76 to abut and secure the individual arched structure members.

Figure 3:
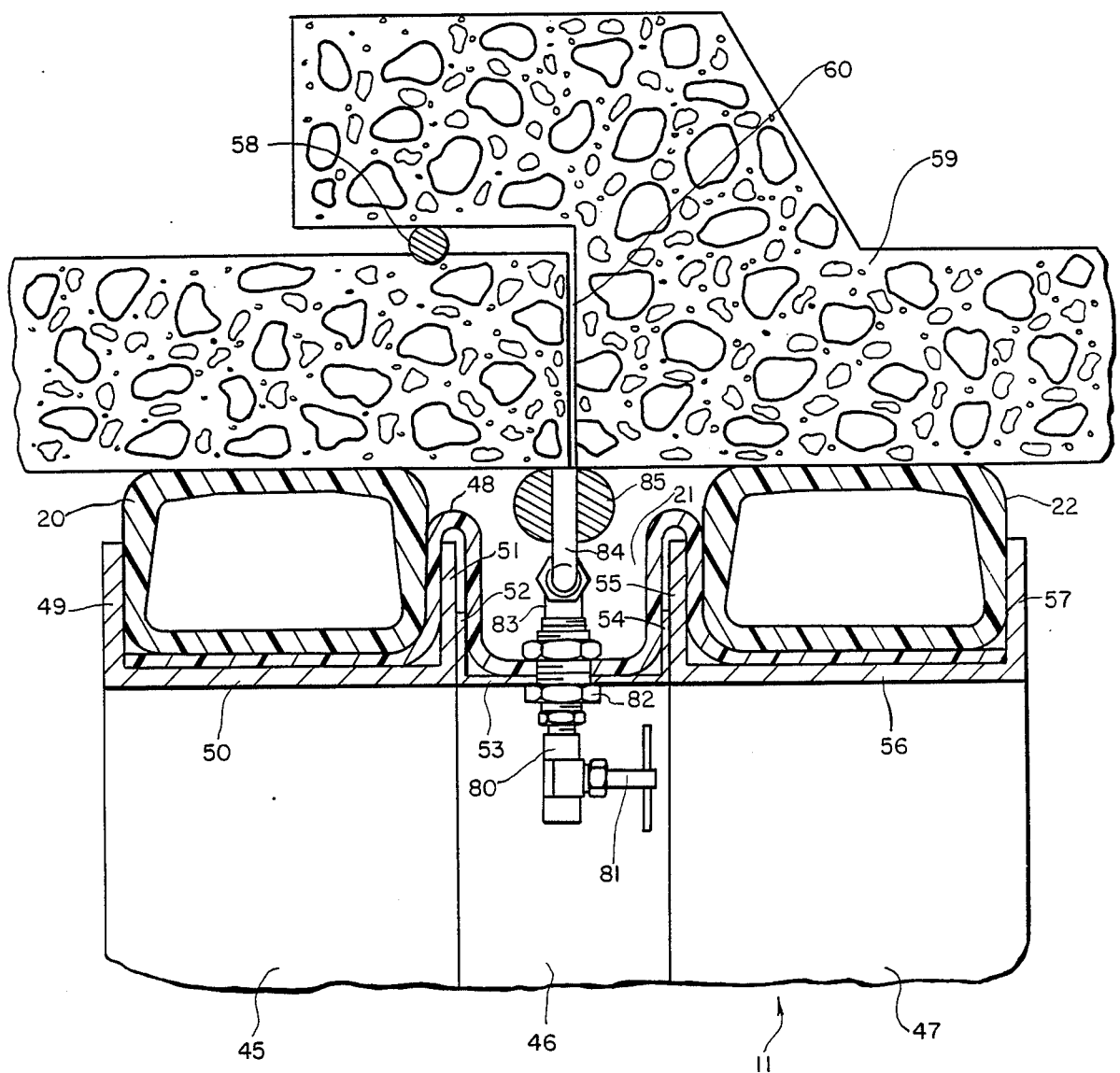
FIG. 3 is a partial sectional view of the sealing and testing apparatus which shows air egress means utilized in the apparatus when a liquid fluid is used for testing pipeline joints.

FIG. 3 particularly illustrates the inner sleeve liner 48 extending from channel member 45 into the testing channel member 46 and to channel member 47. The channel support structure 11 also shows channel member 45 to have side rail 49, bottom member 50 and side rail 51, testing channel member 46 to have side rail 52, bottom member 53 and side rail 54, and channel member 47 to have side rail 55, bottom member 56 and side rail 57. This particular configuration can be altered by welding, extruding or otherwise joining individual pieces to result in the overall configuration shown for the individual support structure segments.

Typically, the width of the outside channel members are 5 inches in width to receive a 4.25 inch end element, while the testing channel area therebetween is approximately 3 inches in width. This size configuration (13 inches total width) permits the individual support structures to be transported through a manhole access along with the other elements of this apparatus. The remaining elements also cooperate with these dimensional elements to provide an efficient apparatus in sealing and testing pipeline joints. The inner sleeve liner 48 extends through the entirety of the testing channel area to cover and seal the joints 15 and any protruding bolts and it extends into the outer channels 45 and 47 to at least underneath the end elements 20 and 22 to be held thereby.

FIG. 3 further shows the inflatable end elements 20 and 22 and testing channel 21 being inflated for sealing the pipe section joint 60 of pipe section 59. As is usual in the construction of pipelines, the joints 60 between the pipe sections 59 have sealing gaskets 58.

Figure 4:
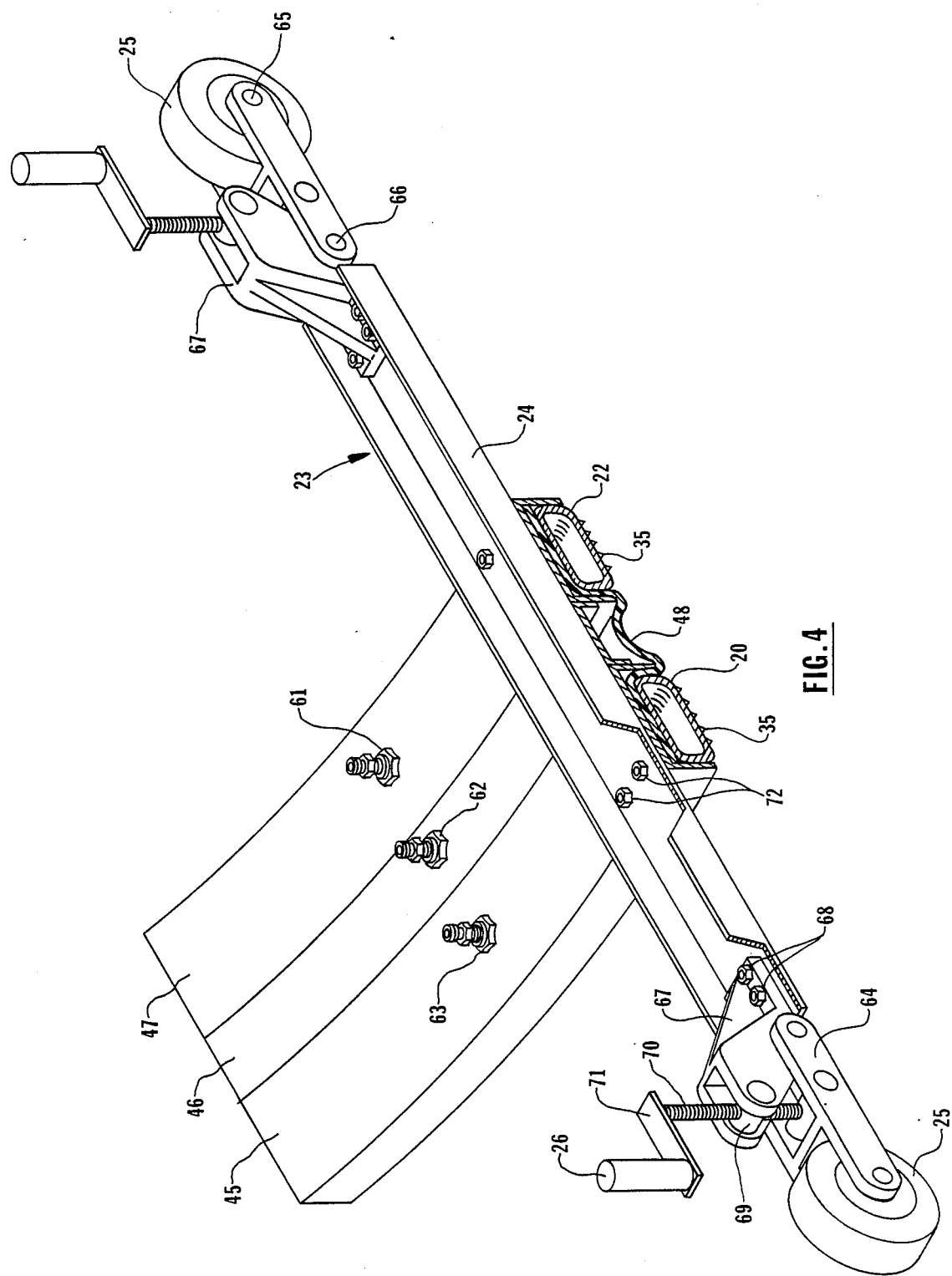
FIG. 4 is a partial sectional view of the sealing and testing apparatus of the invention which shows its channeled support structure and an adjustable wheel assembly thereof.

FIG. 4 illustrates threaded connectors 61, 62 and 63 which are bulk head type connector fittings disposed through channel member 47, testing channel member 46 and channel member 45. These connector fittings provide means to communicate hoses 30, 31 and 29 respectively to inflatable end element 22, testing channel 21 and inflatable end element 20.

Particularly shown in FIG. 4 is the movable wheel support bracket 64 which has axle 65 for wheel 25 and pivot pin 66 extending and fixed thereto for relative rotation of the wheels 25 and the rotational movement of the wheel support bracket 64 with respect to bracket mount assembly 67. The bracket mount assembly 67 is mounted to frame member 24 by means of bolts 68. A pivot pin 69 is provided with a threaded aperture to receive threaded shaft 70 to which handle mount 71 and handles 26 are rigidly fixed.

The threaded shaft 70 extends into pivot pin 73 so that the rotational movement of handles 26 causes the movable wheel support bracket 64 and, therefore, the wheels 25, to move up and down with respect to frame member 24 which is connected to channel support structure 11 by bolts 72 to thereby lift or drop the channel support structure 11 for proper placement and positioning in the pipe section 59.

As is shown in FIGS. 1 and 3, a drain structure is provided to permit the pipe joint sealing and testing apparatus 10 to utilize a liquid fluid testing medium in the testing channel 21. The drain structure has a bulk head connector 82 which has an elbow 83 to which flexible tubing 84 and the connecting flotation device 85 is connected. Below bulk head connector 82 a shut-off valve 80 with valve handle 81 is provided to control the egress flow of the trapped air in the testing channel 21 as a liquid test medium is filled in testing channel 21 via fluid inlet 78 and conduit 31. As shown in FIG. 1, the tubing end 86 extends through floatation device 85 so that it is able to provide express to any trapped air until the testing channel area is completely filled with the liquid test fluid.

Figure 5:
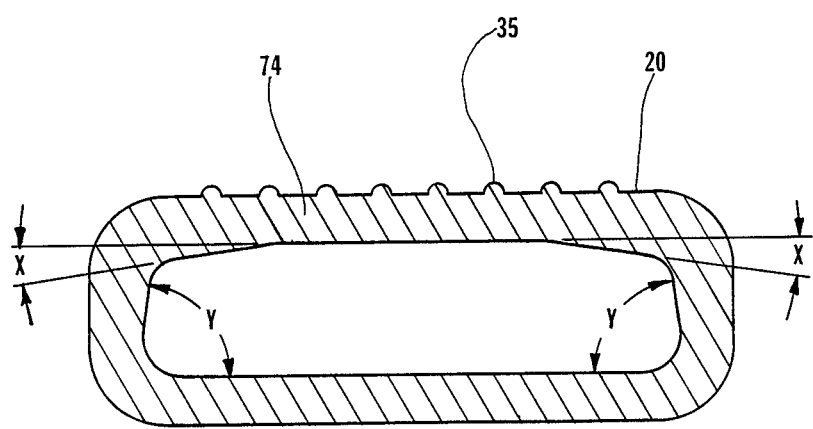
FIG. 5 is a cross-sectional view of an uninflated end element of the pipe joint sealing and testing apparatus of this invention.

FIG. 5 illustrates the design of the end element wall structure having a body 74 and sealing ribs 35 disposed on its exterior surface. The body 74 has a particular interior trapezoidal cross sectional configuration with angled bottom corners of approximately 82 degrees ("Y") and sloped upper corners which are slanted at approximately 8 degrees ("X"). This trapezoidal configuration when inflated, as is shown in FIGS. 2 and 3, provide optimal force transmission of the inflatable end element 20 for sealing against the interior wall of pipe section 59.

The three channeled structure 11 is constructed of a lightweight material such as aluminum and it can be welded channel unit as shown in the figures or one assemble of extruded one piece member structures.

Figure 6:
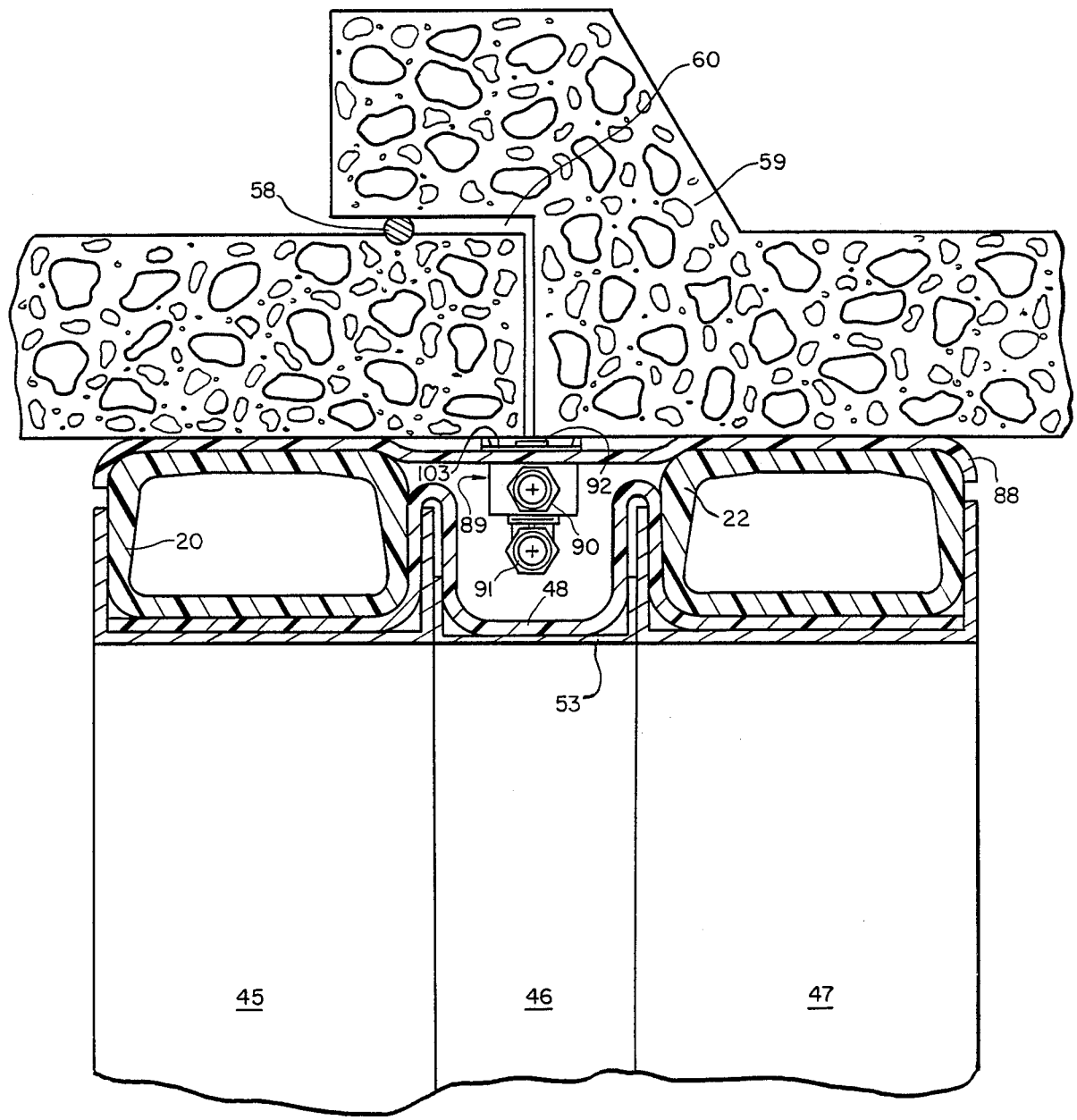
FIG. 6 is a partial sectional view of the sealing and testing apparatus which shows the sealing chemical dispensing assembly in a position to seal a pipeline joint.

FIG. 6 illustrates another embodiment of the pipe joint sealing and testing apparatus 10 wherein the apparatus has additional elements to chemically seal any pipeline joints which leak or to seal a fissure in a pipe section.

As shown, an outer sleeve 88 is provided which stretchingly covers the inflatable end elements 20 and 22. The outer sleeve 88 is constructed of an elastomeric material and it has a diameter smaller than the exterior diameter of the inflatable end elements 20 and 22, as will be further discussed below. Centrally placed in outer sleeve 88, in the testing channel member 46 area, is a chemical dispensing assembly 89. The chemical dispensing assembly 89 is sealingly mounted to and through outer sleeve 88.

The configuration and dimensions of the outer sleeve 88 is important to its function and cooperation with the other elements of the sealing and testing apparatus of this invention. The outer sleeve 88 and the end elements 20 and 22 are prefereably constructed of elastomeric materials, natural rubber, neoprene, N.B.R., Viton and urethanes.

For an apparatus used in sealing, testing and packing 2–18 feet in diameter pipeline sections, an outer sleeve 88 preferably has a 0.125–0.375 inch thickness, with a 0.187–0.250 inch thickness being ideal.

Further important is the width of the outer sleeve 88 with respect to the distance between the outer corner edges of the end elements 20 and 22. The outer edges of the sleeve 88 with respect to the outer corner edges of the end elements preferably ranges from being flush to 4 inches overlapping each corner edge with a one inch overlap being ideal.

The diameter of the outer sleeve 88 with respect to the diameter of the end elements 20 and 22 is likewise important. Because of the required collapsibility and assembly of the apparatus, the outer sleeve 88 is designed to frictionally fit the end elements. With respect to the outside diameter of the end elements in their uninflated state, the diameter of the outer sleeve 88 is smaller, preferably from a minimum of 1% to a maximum of 10%.

Figure 7:
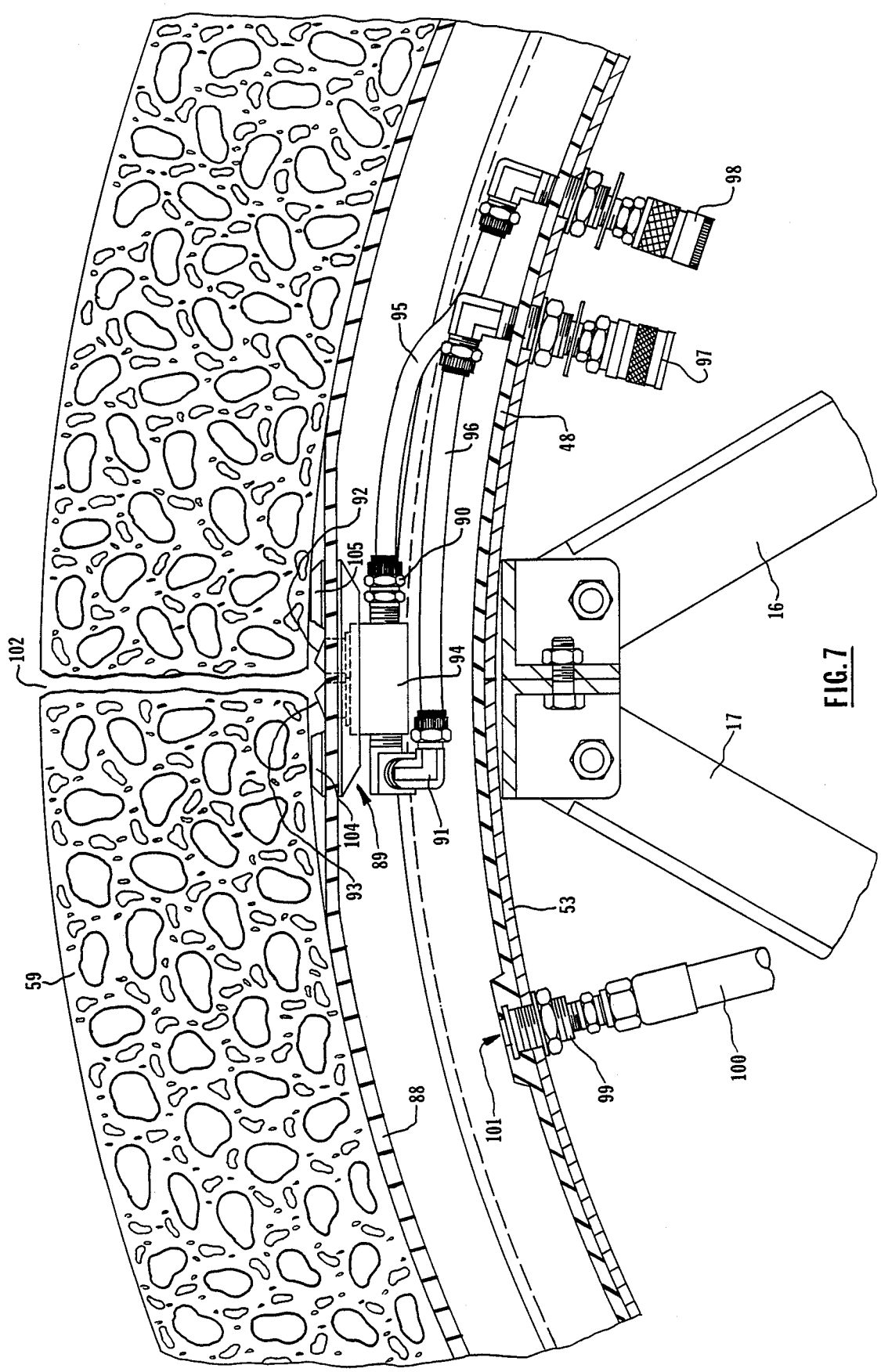
FIG. 7 is a partial sectional view of the sealing, testing and packing apparatus which also shows the chemical dispensing assembly of this invention.

Referring further to FIG. 7, the chemical dispensing assembly 89 has a dispensing block 94 having a chemical inlet connection 90 and a catalyst inlet connection 91.

Hose assemblies 95 and 96 are respectively connected to chemical inlet connection 90 and to catalyst inlet connection 91 and which terminate for connection to quick connectors 98 and 97. Quick connectors 97 and 98 extend through bottom member 53 and inner sleeve liner 48 to the exterior of the pipe joint sealing and testing apparatus 10 so that they are connectible to a catalyst source and to a chemical sealant source.

The dispensing block 94 has a chemical dispensing nozzle 92 and a catalyst dispensing nozzle 93 which permit the chemical and catalyst to mix upon dispensing to seal a pipeline leak as is known in the pipeline rehabilitation industry. For example, chemical sealant compounds consisting of urethanes, acrylamides and acrylites are dispensed through nozzle 92 and a catalyst consisting of primarily water with certain additives is dispensed through nozzle 93. The dispensing block 94 is secured to the outer sleeve 88 and the nozzles 92 and 93 are secured in place by means of cover plate 103 which has stand off elements 104 and 105 to keep the dispensing nozzles 92 and 93 from the pipe section wall.

For initially testing a pipe section 59 for a leak caused by a pipeline fissure 102, for example, the catalyst dispensing nozzle 93 is used to dispense the testing fluid, such as water. Additionally, if air is desired as the testing fluid, a three way selection valve placed at the catalyst line can be utilized. Subsequent the dispensing of the testing fluid the outer sleeve 88 is pressurized utilizing the air inlet connector 99 having an aperture 101 and hose 100. The hose 100 is monitored to determine whether a leak exists in the pipeline joint or in the pipeline section that is being tested.

When a leak area or fissure is located, the chemical dispensing nozzle 92 and catalyst dispensing nozzle 93 are activated to dispense the sealing chemical and catalyst. Subsequently, the air inlet connector 99 is utilized to pressurize the outer sleeve 88 so that the chemical sealant and catalyst is packed into the leak area and is permitted to cure therein. Thereafter, the area can be retested for leakage to ensure that a proper chemical cure has been made.

This invention also involves a method for interiorly sealing and testing the pipe joints of a large diameter pipeline with the separable and lightweight inflatable testing apparatus described herein and having elements which are transportable through a pipeline manhole access of approximately 20–22 inches in diameter. First, a separable and lightweight inflatable sealing and testing apparatus is provided as discussed above. Next, the separable elements of the apparatus are transported through the manhole access, and assembled in the interior of the pipeline. The assembled apparatus is then centered about a pipeline joint to be tested. After inflating the sealing rings of the apparatus, the pipeline joint is tested for leakage by operating the test panel member of the apparatus.

The method for sealing, testing and packing a pipeline joint is similar to that described above. The difference being that the testing fluid is dispensed through the catalyst nozzle to detect possible leaks by monitoring the pressure in the testing channel cavity. Subsequently, the nozzles 92 and 93 are utilized to inject the chemical sealant and catalyst into the joint area and the outer-sleeve is then pressurized to pack the sealant mixture into the joint area for curing.

As many changes are possible to the embodiments of this invention, utilizing the teachings thereof, the description above, and the accompanying drawings should be interpreted in the illustrative, and not the limited sense.

That which is claimed is:

1. A separable and lightweight inflatable pipe joint sealing and testing apparatus comprising:
   (a) a plurality of separate, unitary, lightweight and connectable arched channel support structure members having a circular segment configuration and having three parallelly disposed channeled members extending outwardly therefrom, said channeled members being outer channels having the same predetermined height and having a centrally disposed testing channel therebetween,
   (b) connecting means being disposed at each end of said arched channel support structure members for mating connection to adjacent arched members to form a separable circular structure,
   (c) a unitary inner sleeve member for covering and sealing the centrally disposed testing channel member and extending into said outer channels,
   (d) a pair of inflatable sealing rings for placement and expansion in the outer channel members, said sealing rings having an interior trapezoidal configuration having bottom interior corners with acute angles, said sealing rings further having air ingress means,
   (e) compressed air source means in communication with the air ingress means of said pair of inflatable sealing rings,
   (f) test fluid ingress means, and
   (g) a removable test panel member mountable to the interior of said channel support member structure having compressed air and test fluid control means, air pressure and fluid pressure indicating means mounted thereto and being in communication with said compressed air source means and said test fluid ingress means.

2. The inflatable pipe joint sealing and testing apparatus of claim 1, wherein said inflatable sealing ring members additionally have a plurality of circumferentially disposed sealing ribs extending outwardly therefrom and being in a parallel configuration, and wherein each said sealing ring member has a trapezoidal cross-sectioned configuration having bottom interior corners of approximately 82 degrees and interior sloped upper corners slanted at approximately 8 degrees.

3. The inflatable pipe joint sealing and testing apparatus of claim 1, wherein said test fluid ingress means is in communication with said centrally disposed channel member and wherein a flexible drain hose having a shut off valve is in communication with the uppermost point of said centrally disposed channel member to provide a test fluid egress means.

4. The inflatable pipe joint sealing and testing apparatus of claim 1, wherein an outer sleeve member stretchingly covers the peripheral exterior of said device, said outer sleeve member having a predetermined width and a predetermined diameter whereby said flexible sleeve member is constructed and arranged to stretchingly cover at least the exterior surfaces of each said inflatable sealing rings.

5. The inflatable pipe joint sealing and testing apparatus of claim 4, wherein a chemical dispensing assembly extends through and is affixed to said outer flexible sleeve member, said chemical dispensing assembly having a chemical dispensing nozzle and a catalyst dispensing nozzle and having conduit means connected thereto for supplying a chemical sealant and a catalyst, and air inlet means extending through and affixed to said testing channel to permit the flow of pressurized air therethrough for pressurizing said outer flexible sleeve member, and wherein said catalyst dispensing nozzle is in selective communication with said test fluid ingress means.

6. The inflatable pipe joint sealing and testing apparatus of claim 1, wherein said plurality of support member structure is comprised of at least two arched channel sections, and wherein said inner liner sleeve member and said pair of inflatable sealing ring members are constructed of an elastomeric material.

7. The inflatable pipe joint sealing and testing apparatus of claim 1, wherein said apparatus has two adjustable wheel assemblies each being comprised of a frame member mountable to the inner bottom surface of said support structure member, adjustment arms with handle members attached to the ends of said frame member and a wheel rotatably and pivotly mounted to the ends of said frame member and being in communication with said adjustment arms.

8. The inflatable pipe joint sealing and testing apparatus of claim 1, wherein said support member structures are of an extruded aluminum construction, and wherein said support structure member additionally has a triangulated cross-member support structure mounted to the interior thereof at said support structure member connecting means.

9. The inflatable pipe joint sealing and testing apparatus of claim 1, wherein said test panel member additionally has an automatic closing valve in communication with said compressed air source means, said closing valve being operative at a predetermined air pressure.

10. A separable, lightweight and inflatable pipe joint sealing and testing apparatus for use in large diameter pipelines comprising:
(a) a plurality of separate and unitary connectable arched channel support structure members to form a circular segment configuration of a predetermined diameter, having three parallelly disposed channel members extending outward therefrom, said channel members being two outer channel members and a centrally disposed testing channel member therebetween, each said channel members additionally having a port extending therethrough,
(b) a unitary inner sleeve member for covering and being coextensive with said channel members of said support structure and having apertures therethrough for exposing said channel member ports,
(c) a pair of inflatable annular sealing ring members for placement in the outer channel members, said inflatable sealing ring members additionally having a plurality of circumferentially disposed sealing ribs extending outwardly therefrom and being in a parallel configuration, and wherein each said sealing ring member has an interior trapezoidal cross-sectioned configuration having bottom interior corners having acute angles of approximately 82 degrees and interior sloped upper corners slanted at approximately 8 degrees,
(d) compressed air source means in communication with said pair of inflatable sealing rings through said channel member and sleeve member ports,
(e) compressed test fluid ingress means in communication through said port of said centrally disposed channel member, and
(f) a removable test panel member mountable to said channel support structure having compressed air and test fluid control means, air pressure and fluid pressure indicating means mounted thereto and being in communication with said compressed air source means and said compressed fluid ingress means.

11. The inflatable pipe joint sealing and testing apparatus of claim 10, wherein said test fluid ingress means is in communication with said centrally disposed channel member and wherein a flexible drain hose having a shut off valve is in communication with the uppermost point of said centrally disposed channel member to provide a test fluid egress means.

12. The inflatable pipe joint sealing and testing apparatus of claim 10, wherein an outer sleeve member stretchingly covers the peripheral exterior of said device, said outer sleeve member having a predetermined width and a predetermined diameter whereby said flexible sleeve member is constructed and arranged to stretchingly cover at least the exterior surfaces of each said inflatable sealing rings, and wherein a chemical dispensing assembly extends through and is affixed to said outer flexible sleeve member, said chemical dispensing assembly having a chemical dispensing nozzle and a catalyst dispensing nozzle and having conduit means connected thereto for supplying a chemical sealant and a catalyst, and air inlet means extending through and affixed to said testing channel to permit the flow of air therethrough for pressurizing said outer flexible sleeve member, and wherein said catalyst dispensing nozzle is in selective communication with the test fluid ingress means.

13. The inflatable pipe joint sealing and testing apparatus of claim 10, wherein said apparatus has two adjustable wheel assemblies each being comprised of a frame member mountable to the inner bottom surface of said support structure member, adjustment arms with handle members attached to the ends of said frame member and a wheel rotatably and pivotly mounted to the ends of said frame member and being in communication with said adjustment arms.

14. The inflatable pipe joint sealing and testing apparatus of claim 10, wherein said plurality of support member structure is comprised of at least two arched channel sections, and wherein said inner liner sleeve member and said pair of inflatable sealing ring members are constructed of an elastomeric material.

15. The inflatable pipe joint sealing and testing apparatus of claim 10, wherein said support member structures are of an extruded aluminum construction, and wherein said support structure member additionally has a triangulated cross-member support structure mounted to the interior thereof at said support structure member connecting means.

16. A separable, lightweigh inflatable pipe joint sealing, testing and packing apparatus comprising:
(a) a plurality of lightweight arched channel support structure members having a circular segment configuration and having three parallelly disposed channeled members extending outwardly therefrom, said channeled members comprising outer channels of the same predetermined height and having a centrally disposed testing channel therebetween,
(b) connecting means being disposed at each end of said arched channel support structure members for mating connection to form a separable circular structure, (c) a unitary inner sleeve member covering said channel support structure across its width, (d) a pair of inflatable sealing rings for placement and expansion in the outer channel members, each said sealing ring having air ingress means, (e) compressed air source means in communication with the air ingress means of said inflatable sealing rings, (f) an outer flexible sleeve member for stretchingly covering the peripheral exterior of said device, said outer sleeve member having a predetermined width and a predetermined diameter whereby said flexible sleeve member is constructed and arranged to stretchingly cover at least the exterior surfaces of each said inflatable sealing rings, (g) a chemical dispensing assembly extending through and affixed to said outer flexible sleeve member, said chemical dispensing assembly having a chemical dispensing nozzle and a catalyst dispensing nozzle and having conduit means connected thereto for supplying a chemical sealant and a catalyst, (h) air inlet means extending through and affixed to said testing channel to permit the flow of air therethrough for pressurizing said outer flexible sleeve member, (i) test fluid ingress means in selective communication with said catalyst dispensing nozzle, and (j) a removable test panel member mountable to the interior of said channel support member structure, said test panel having compressed air and test fluid control means, air pressure and fluid pressure indicating means mounted thereto and being in communication with said compressed air source means and said test fluid ingress means.

17. The inflatable pipe joint sealing and testing apparatus of claim 16, wherein said inflatable sealing ring members additionally have a plurality of circumferentially disposed sealing ribs extending outwardly therefrom and being in a parallel configuration, and wherein each said sealing ring member has a cross-sectioned configuration having bottom interior corners of approximately 82 degrees and interior sloped upper corners slanted at approximately 8 degrees.

18. The inflatable pipe joint sealing and testing apparatus of claim 16, wherein said outer sleeve member has a width which extends in a range from being flush to 4 inches overlapping the corner edge of each said sealing ring, and wherein said outer sleeve has a diameter being one to ten percent smaller than the diameter of said sealing ring members in their uninflated state.

19. The inflatable pipe joint sealing and testing apparatus of claim 16, wherein said apparatus has two adjustable wheel assemblies each being comprised of a frame member mountable to the inner bottom surface of said support structure member, adjustment arms with handle members attached to the ends of said frame member and a wheel rotatably and pivotly mounted to the ends of said frame member and being in communication with said adjustment arms.

20. The inflatable pipe joint sealing and testing apparatus of claim 16 wherein said sealing rings, said inner sleeve and said outer sleeve are constructed of a material selected from a group consisting of natural rubber, neoprene, N.B.R., Viton and urethanes.

* * * * *